Feb. 24, 1970  B. P. FOHR  3,496,886
PROCESS AND APPARATUS FOR MANUFACTURE
OF LIQUID-FILLED CANDIES WITH A CRUST
Filed Dec. 4, 1967  6 Sheets-Sheet 1

INVENTOR
Bruno P. Föhr
BY
ATTORNEY

United States Patent Office 3,496,886
Patented Feb. 24, 1970

3,496,886
PROCESS AND APPARATUS FOR MANUFACTURE
OF LIQUID-FILLED CANDIES WITH A CRUST
Bruno P. Fohr, Rudesheim (Rhine), Germany, assignor
to Asbach & Co., Rudesheim (Rhine), Germany
Filed Dec. 4, 1967, Ser. No. 687,785
Claims priority, application Germany, Dec. 3, 1966,
A 54,267
Int. Cl. A21d 8/00; A23p 1/00
U.S. Cl. 107—54     11 Claims

ABSTRACT OF THE DISCLOSURE

A process for the manufacture of liquid-filled candies with a crust, comprising the steps of preparing a solution of sugar with water, heating it above about 100° C.; mixing the solution with a flavoring substance to form a filling liquid; decreasing the temperature of the filling liquid to a temperature below the sugar-saturation point temperature of the filling liquid so rapidly that no sugar is allowed to precipitate and casting the rapidly cooled filling liquid into molds.

An apparatus for carrying out the above process comprising sugar, water and flavoring substance supply means with necessary vessels, conduits, valves, valve controls, metering means, temperature detectors, sugar content detectors, heaters, pumps, pressure and speed of flow detectors, refrigerant means, liquid level detectors and their respective electrical output means, motors and controls, and timed automatic dispensing means to cast the processed filling liquid into series of molds on an endless conveyor moving below the last discharge vessel.

Description of the prior art

For the production of liquid-filled candies with a crust, it is conventional to produce a solution of sugar and water at about 110° C., to mix this solution with the desired flavoring substances, particularly alcoholic distillates, e.g., brandy, whereby the temperature of the solution decreases to about 60 to 70° C., and then to fill the solution into hollow molds of any desired configuration impressed into a powder, e.g., starch powder.

The solution cools in the molds. As soon as the saturation temperature of the solution is reached, which temperature depends upon the mixing ratio of water, sugar, flavoring substances, and generally is not below 50° C., the sugar crystallizes on the side walls of the mold and on the surface of the liquid. As soon as a solid crust has formed all around, requiring normally about 2 to 3 days from the instant of filling of the molds, the liquid-filled sugar crusts are removed from the powder and then coated on all sides with chocolate.

In this process, part of the liquid is absorbed by the powder. Thus, it is necessary to dry the powder, after the liquid-filled sugar crusts have been removed, to a moisture content of below 5%. For this purpose, a drying device is necessary.

After filling the forms, a portion of the liquid evaporates, particularly part of the alcoholic distillates, and is lost.

Due to the decrease in volume occurring during cooling of the liquid, at least the surface of the liquid-filled crusts is rough and uneven. Furthermore, projecting edges and corners are very easily formed. When the crusts are coated with chocolate, there is the danger that the crust is crushed at the uneven points, as well as perhaps at the projecting corners and edges and liquid exudes therefrom, or at least contacts the chocolate shell directly.

All finished filled candies do not exhibit the same size, due to the decrease in volume during the crystallization of the sugar and the unevennesses and projecting corners and edges created thereby which are evened out by the chocolate coating step. Also, the crust is very coarsely crystalline and thus brittle. If the filled candies are individually packaged in fully automated packaging machines, there is the danger that somewhere in the packaging machine a piece of candy gets stuck. In many instances, this is not immediately perceived. Then further, filled candies are conveyed by the machine and are crushed. In that case, the packaging machine must be turned off, cleared, and cleaned, thus creating a considerable amount of work and a substantial loss of production.

Summary of the invention

It is an object of the present invention to provide a process for the manufacture of liquid-filled candies with a crust, wherein a hot solution is produced from water and sugar, the solution is then mixed with flavoring substances, particularly alcoholic distillates, and the mixture is subsequently poured into molds at whose walls, as well as at the free surface of the filling, the sugar crystallizes.

Another object of the invention is to eliminate the step of drying the powder to a moisture content of not more than 5% after the crusts have been removed from the powder.

Yet another object of the invention is to avoid evaporation of a filling liquid, particularly of alcoholic distillate.

Another object of the invention is to provide uniform liquid-filled crusts exhibiting all practically the same size, smooth surfaces, and being free of projecting corners and edges.

This objective is attained substantially by cooling the mixed filling liquid, which is still hot, before being poured into the molds, so rapidly to a temperature below the saturation temperature that no sugar precipitates.

According to prevailing teachings, the filling liquid consisting of water, sugar and flavoring agents, particularly alcoholic distillates, must not be cooled in any case, before being poured into the molds, to below the saturation temperature of the sugar, depending upon the concentration, generally about 50° C., because below this temperature the sugar crystallizes, and the crystallized sugar then clogs pumps, pipelines, and the pouring and dosing devices.

However, experiments proved that it is possible to cool the filling liquid to a temperature below the sugar saturation temperature, without the sugar precipitating, if the cooling from a temperature above the saturation temperature to a temperature below the saturation temperature is conducted with sufficient speed.

Thus, the invention overcomes the prevailing opinion taught by the prior art.

A sufficiently rapid cooling is obtained, in particular, by quenching the hot solution, for example in such a manner that the hot solution is allowed to pass over a cooler in the form of a thin veil.

The formation of seed crystals, a prerequisite for the crystallization of the sugar, takes place only very slowly in the solution which is subcooled or oversaturated by the rapid cooling step. In a continuous operation, this solution can be filled into the molds by the conventional pouring and dosing devices without difficulties, no sugar being precipitated by crystallization in these apparatuses. The crystallization commences only in the molds on the side walls thereof and on the surface of the filling liquid. The thus-formed crusts are finely crystalline and very stable (rugged), although they are thinner than in the conventional processes.

The cooling speed must be so great that no sugar precipitates during cooling; the more rapid the cooling process, the less is the danger of crystallization. This cooling velocity is not to be lower than about 20° C. per second.

The filling liquid is to be cooled to as low a temperature as possible. It was found advantageous to cool the liquid to a temperature of below 35° C. If the filling liquid is cooled to a temperature of about 22–26° C., it is still so fluid that it can be filled into the molds by means of the conventional pouring and metering devices, and the formation of seed crystals is, in any event, so slow that there is no sugar crystallization in the continuous operation between the cooling step and the mold filling process.

In this process, it is not necessary for the powder, in which the molds are impressed, to have a moisture of only not more than 5%. The moisture content can readily be higher. Thus, a drying device for the powder is not required. Furthermore, it is not necessary to warm the powder before the pouring step, and to keep it warm thereafter. Thus, the energy consumption is lower.

The sugar crust is formed in a period of time which is no longer than in the process wherein the filling liquid is poured into the molds at a temperature above the saturation temperature, i.e. in 2 to 3 days.

The sugar crust is very fine-grained, so that, when biting into the candies, no individual sugar crystals are felt between the teeth. The crust is very rugged, although it is thinner than the coarsely crystalline crusts in the conventional processes.

The surface of the crusts do not exhibit any unevennesses and any projecting edges and corners. Thus, the danger that, when coating the crusts, uneven portions, projecting edges, and corners are crushed is very small.

The liquid-filled crusts and the coated candies are all of practically the same size. The danger that in the individual packaging of filled candies a piece of candy might get caught in a fully automated packaging machine is therefore extremely small. The amount of work, loss in production, and breakage, incurred when filled candies of irregular size get struck, are eliminated.

The crusts, when removed from the powder after 2 to 3 days, are smooth and clear. In this connection, the powder itself need not be heated, before the filling liquid is poured in, and after removal from the powder, the latter need not be dried. The powder can be reused immediately.

In addition to being employed for the manufacture of liquid-filled candies, particularly alcohol candies, the process can also be utilized for the production of other liquid-filled sweets and the like wherein the crust surrounding the liquid is created by the crystallization of substances from a liquid.

The process requires a considerable amount of powder to be utilized. The molds must be impressed into the powder, and the filled molds are to be stored in chambers which are as dry as possible. The finished crusts must then be removed from the powder, and during this procedure the personnel is considerably inconvenienced due to the dust produced thereby. Finally, a plant for coating the finished crusts with chocolate is necessary.

It is a further object of this invention to eliminate the maintenance of powder, the impressing of the molds into the powder, the storage, and the storage chambers for the filed molds, the removing of the crusts from the powder, and the coating of the crusts with chocolate, as well as the plants, spaces, and devices required therefor, and to avoid annoyance of the personnel by the powder dust.

This problem is solved essentially by filling the subcooled and saturated filling liquid directly into hollow chocolate bodies which are prefabricated in a conventional manner and are employed in general in the manufacture of liquid-filled hollow candies, for example, brandy beans. The filled hollow bodies are then closed in a likewise conventional manner, and as is generally customary in the production of liquid-filled candies without a crust, e.g., brandy beans.

For purposes of this process, the filling liquid is cooled to a temperature below the melting point of the chocolate, suitably to a temperature of 35° C., preferably about 28° C.

In the closed candy, the sugar crystallizes on the side walls. In order to prevent the crust from becoming thicker on one side than on the other, it is advantageous to invert the closed filled candies after a certain period of time.

The sugar crusts crystallizing on the side walls of the cavity at the temperatures at which the candies are stored after their manufacture are very fine-grained. When biting through the candies, practically no individual sugar crystals are felt between the teeth. The sugar crust, which prevents alcohol from diffusing through the walls of the candy and further prevents the liquid from affecting and dissolving the chocolate, need only be very thin, since this crust now serves only the purpose of avoiding the diffusion and the attack on the chocolate, but not the purpose of obtaining bodies which must withstand manipulation.

By the method of the present invention no production losses are possible by breakage of the sugar crust. The liquid cannot be absorbed by the powder any more, even to an only minor extent, since no powder is utilized. An evaporation of the alcohol, as it occurs in the conventional powder processes during storage for crust formation is not possible.

In this connection, the amount of personnel and working hours required is no larger than in the so-called hollow shell process. As compared to this process, this further development of the present invention exhibits the advantage, however, that, on account of the sugar crust, no alcohol diffuses through the chocolate shell, and additionally the liquid does not attack the chocolate. Thus, the shelf life is considerably longer as compared to the crustless filled candies, and is just as long as in those candies which are coated with chocolate after the formation of the sugar crust.

In this embodiment of the process of the invention, it is generally possible to employ the conventional plant for producing the hollow bodies.

It is a further object of this invention to provide a device by means of which it is possible to cool the filling liquid, which has been completely prepared and exhibits a temperature above the saturation temperature, so rapidly to a temperature below the saturation temperature that no sugar precipitates.

This problem is solved substantially by employing a device consisting of a container for the already prepared filling liquid and a pouring vessel for metering and pouring the filling liquid into the molds, in which device, between the container for the already prepared filling liquid and the pouring vessel, a cooler, preferably an external cooling device, is provided. Suitably, the cooler, in this connection, is disposed underneath the outlet of the container for the already prepared filling liquid and above the inlet of the pouring vessel. If it is necessary, for constructional or other reasons, to arrange the container for the filling liquid, the cooler, and the pouring vessel at a spacing from one another, it is possible to conduct the liquid through pipelines or hoses from the preceding structural part to the subsequent component. If it is impossible, for constructional or other reasons, to arrange the individual parts of the device one after the other in such a manner that the liquid flows by itself from one component of the apparatus to the other part, then it is possible in the process of this invention to provide appropriate conveying means between the individual parts of the plant, or to transport the liquid in corresponding vessels. In this device, the hot filling liquid flows onto the cooler, is quenched at that point to a temperature below the saturation temperature, and then flows into the pouring vessel, from which it is poured, in doses, into the molds, be it molds impressed in powder or prefabricated hollow chocolate bodies.

A suitable external cooler is of a plate-shaped configuration, arranged vertically or inclined. A tubular cooler proved to be advantageous consisting of several pipes provided one below the other, suitably bent from a pipe coil. The cooling medium can be fed to the cooler from below as well as from above. However, it is advantageous to provide the cooler with cooling medium from the bottom. On a technical scale, two or more coolers can be arranged one after the other.

In a further embodiment of the invention, the provision is made to arrange a special storage tank behind the solution tank wherein the water-sugar solution is produced, and behind the mixing container customarily disposed after the solution tank wherein the water-sugar solution is mixed with the flavoring substances, particularly the alcoholic distillates, from which the special storage tank the hot filling liquid flows upon the cooler. This storage tank can be disposed directly beneath the mixing vessel and can be connected therewith by pipes or hoses. However, it is also possible to arrange the storage tank at a distance from the mixing vessel and provide, if required, appropriate conveying means in the conduits, or to convey the liquid in corresponding containers.

In order to ensure that the entire amount of liquid impinging upon the cooler within a particular unit of time is suddenly quenched to as low a temperature as possible, it is advantageous to provide in the bottom of the container from which the liquid flows upon the cooler an elongated, narrow outlet slot, extending in parallel to and above the upper edge of the cooler; in this connection, the cooler suitable projects laterally beyond the outlet slot in order to ensure that all of the liquid exiting from the outlet slot impinges upon the cooler.

The outlet slot is suitably disposed in the bottom on one side thereof and advantageously extends across the entire breadth of the storage tank.

In a special embodiment, a V-shaped channel is arranged in the bottom, the outlet slot being provided in one leg of this V at the tip thereof. In this connection, the outlet shoe can be suitably closed by means of a slide provided on the bottom or underneath the bottom.

In order to ensure that all of the liquid running down from the cooler is recovered, a collecting trough is arranged, in a suitable further development of the device, underneath the cooler between the latter and the pouring vessel; this collecting trough is in communication with the pouring vessel by pipelines or hoses. The pouring vessel can be provided at a spacing from the collecting trough, and, if necessary, an appropriate conveying means can be arranged in the connecting line to transport the cooled liquid, or the liquid can be transported in appropriate containers.

The device for subcooling and thus oversaturating the hot filling liquid thus suitably comprises a container from which the liquid flows onto the cooler; a cooler provided therebeneath; and a collecting trough arranged underneath the cooler. In this connection, this device cannot only be employed for the process of the present invention, but generally for the subcooling and thus for the oversaturation of solutions of solid, particularly crystalline, substances in liquids.

In order to ensure absolutely that no sugar crystallizes in the pouring vessel, due to friction or other effects upon the subcooled, oversaturated liquid, it is furthermore possible to arrange the outlet openings, which are disposed as only a single one or in a plurality provided in rows beside and/or behind one another and which can be closed off, in such a manner that the seals are plates contacting the bottom above the outlet openings and which can be lifted and lowered, these plates consisting preferably of a synthetic material, since the latter is not attacked by the filling liquid.

In this type of construction of the pouring vessel, no metering device is arranged at the outlets. The amount discharged is determined solely by the unit of time during which the outlet openings are open, and the height of the liquid level above the discharge openings. In order to make sure that the discharged quantity is always approximately the same, it is possible, in accordance with a further embodiment of the invention, to arrange between the collecting trough or the cooler and the pouring container an intermediate receptacle with an outlet opening which can be sealed off in the same manner as the outlet openings in the pouring vessel; this outlet opening is opened and closed in dependence upon the height of the liquid level in the pouring vessel. In this manner, it is possible to maintain the liquid level in the pouring vessel always at approximately the same level. In this connection, it is not absolutely necessary to provide this intermediate container and the pouring vessel one above the other. If it cannot be avoided for constructional or other reasons, this intermediate tank and the pouring vessel can be arranged at a spacing from each other; in this connection, if necessary, conveying means can be disposed in the connecting conduits between these two containers.

The pouring vessel and, if necessary, the intermediate container are not only suitable for the process of the present invention, but generally usable for pouring and, if required, metering subcooled and thus oversaturated solutions of solid, particularly crystalline substances in liquids.

For actuating the seals, the plates are fastened to closing rods; at the upper ends of these rods, which suitably project from the container, there engage the means operating the seals, particularly electromagnets.

The means actuating the seals of the pouring vessel are coupling with switching elements. These switching elements are actuated by the pouring mold when this mold has assumed the correct position underneath the pouring mold when this mold has assumed the correct position underneath the pouring vessel and then open up the feed of operating medium such as electricity, pressurized air, pressurized oil or the like, depending upon the type of actuating device for the seals, to the means actuating the seals, whereby the seals are lifted. After a predetermined period of time, the feed of operating medium is again interrupted by these switching elements, and thereby the seals are closed again. The time required from the instant of opening to the instant of interrupting the feed of operating medium is dependent upon the quantity discharged per time unit from an opening, and required for the filling of a mold.

In a suitable further embodiment of the invention, it is advantageous to couple the driving device for the conveying unit of the mold with these switching elements. In that case, the switching elements interrupt the feed of operating medium to the driving device of the transport unit for the molds upon the correct positioning of the pouring mold underneath the pouring vessel, and initiate the feed of operating medium when the filling procedure is terminated.

Suitable pouring vessels are those having a loosely resting lid thereon, which lid laterally projects over the contained. In this connection, vertical perforations are disposed in the lid, through which perforations the upper ends of the closing rods extend. Advantageously, the closing rods widened above the lid, for example by counter nuts threaded thereon, so that, when the lid is removed, the closing rods with the seals can be simultaneously removed from the container. The means actuating the seals, particularly electromagnets, are disposed laterally above the lid. These means engage vertically downwardly oriented rods provided with bent sections at the bottom, which sections face one another; with these bent sections, the rods engage underneath the rim of the lid, which rim projects beyond the pouring vessel. In this connection, the lid can be provided with a frame (rack) on its underside, which frame extends over the upper edge of the container and closely contacts on the outside a partial section of the side walls.

In order to ensure that the liquid exhibits always an approximately equal viscosity, it is possible to arrange a temperature measuring device in the pouring vessel or in the intermediate container, or preferably in the collecting trough. If the temperature of the filling liquid flowing down from the cooler increases, the seal of the outlet slot in the storage tank is closed to a larger extent; if the temperature decreases, this seal is opened to a greater degree. Suitably, the temperature measuring device is coupled with a regulating unit actuating the seal in a corresponding manner.

The amount of liquid exiting in one unit of time from each opening of the pouring vessel is substantially dependent upon the height of the liquid level in the pouring vessel. In order to make sure that this liquid level is always approximately the same, a liquid level indicator is advantageously disposed in the pouring vessel, closing, upon an increase in the liquid level, the seal of the intermediate container by way of appropriate control or switching elements, and opening this seal when the liquid level becomes lower.

In order to ensure a safe cooperation of all individual components of the device and, additionally, to render the device portable, if desired, it is possible to dispose the essential parts, namely the storage tank, the cooler, and the pouring vessel, as well as, if desired, the collecting trough and the intermediate container, in an appropriate sequence once below the other in a frame, in such a manner that these parts are fixedly but detachably mounted.

In order to avoid that the coolant must be discarded after having passed through the cooler, it is advantageous to arrange a cooling unit in the coolant cycle of the cooler. In this manner, it is avoided that, for example, when employing water as the cooling medium, the water loss becomes too high, or that the water temperature increases too much, thus rendering the cooling period too long, which leads to crystal formation on the cooler.

Description of the preferred embodiments

Figure 1:
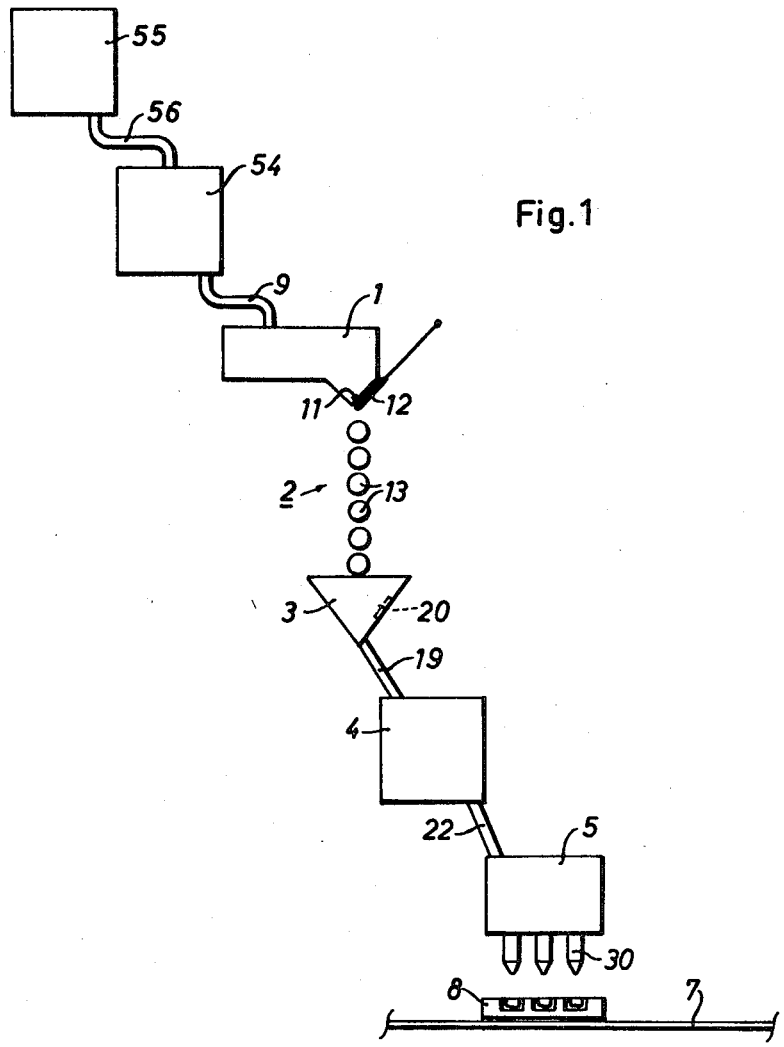
FIGURE 1 shows a schematic view of the means to manufacture in accordance with the invention.

Referring now to the drawings, where like reference numerals designate same or equivalent parts throughout the several views, there are shown by way of examples:

In FIGURE 1, a container 55 wherein water-sugar solution is produced at about 110° C., a mixing vessel 54 wherein the solution is admitted from the container through conduit 56 and mixed with flavoring substances, particularly alcoholic distillates. In conduit 56, conveying means, e.g., pumps, are interposed if necessary. The material is guided into storage tank 1, a cooler 2, and a collecting trough 3 follow. A conduit 19 connects the latter with an intermediate container 4. From there the material enters the pouring vessel 5 through the conduit 22. Preferably the several means 1 through 5 have a common housing 6. A conveyor belt 7 is arranged underneath the pouring vessel and a pouring mold 8 is transported by the belt. The liquid, prepared by mixing, flows through the feed pipe 9 from the mixing vessel into the storage tank 1.

Figure 2:
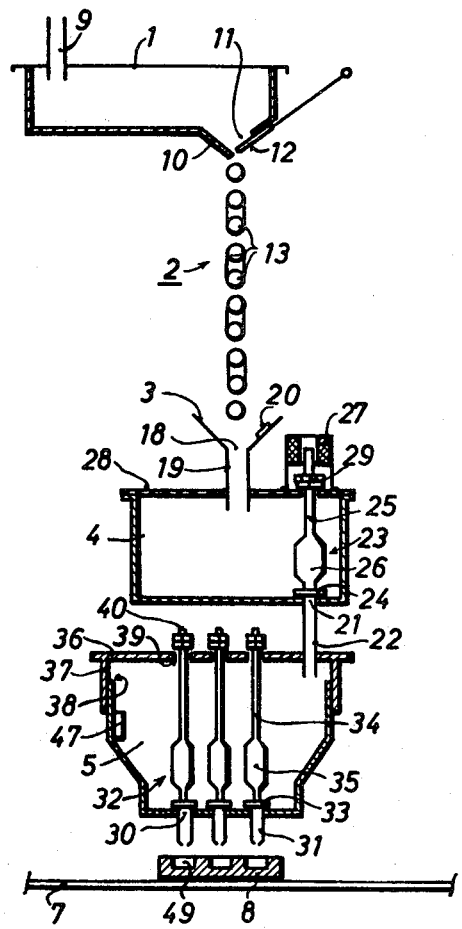
FIGURE 2 is a vertical sectional view and partly schematic, of a portion of the apparatus shown in FIGURE 1.

FIGURE 2 shows specifically a unit having a storage container, a cooler, an intermediate container, and a pouring vessel, at right angles to the longest axis of the cooling pipes. The system of this figure comprising a storage container, a cooler, and a collecting trough can be used in general for the subcooling of solutions of solid, particularly crystal line substances in liquids.

Figure 3:
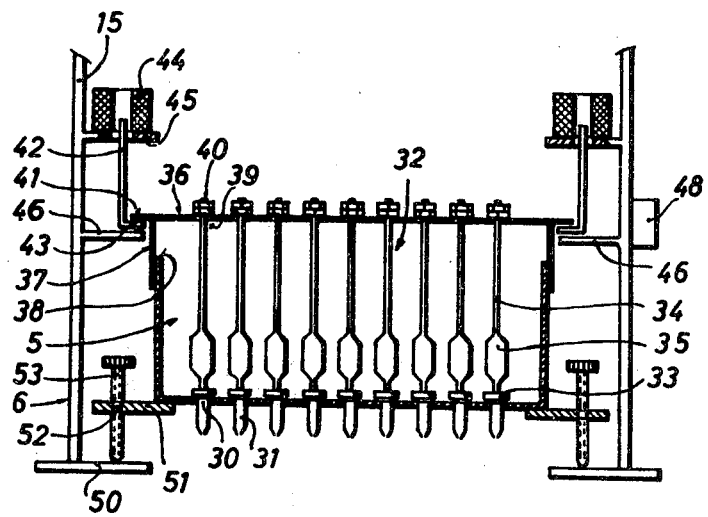
FIGURE 3 is a detailed sectional view of a portion of the apparatus shown in FIGURE 1.
Figure 4:
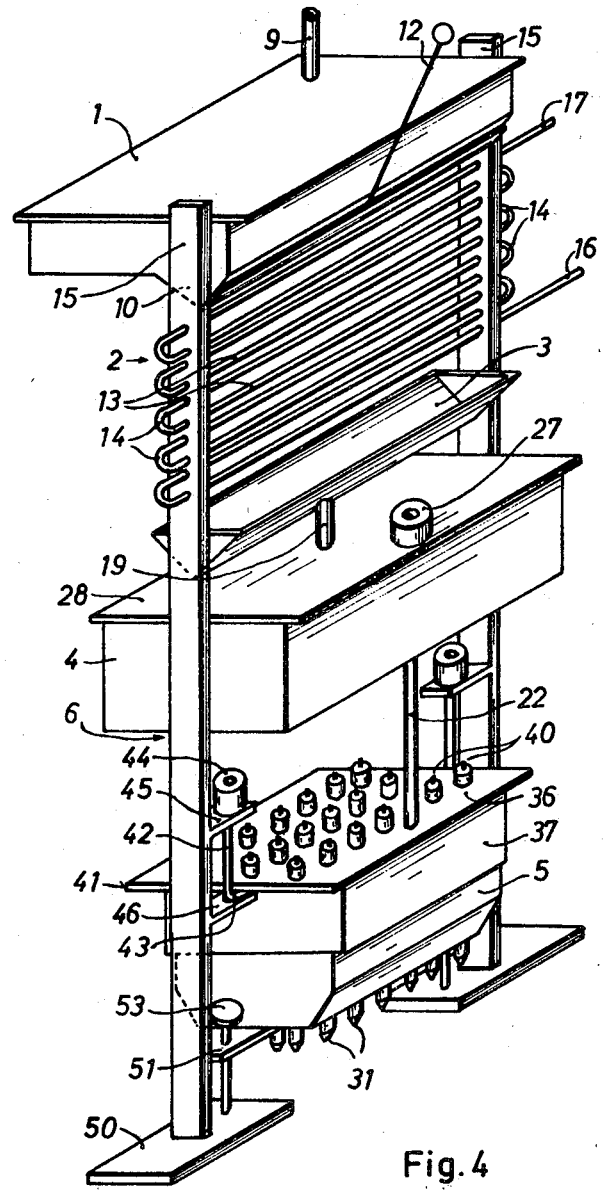
FIGURE 4 is a perspective view of a portion of the apparatus of FIGURE 1.

FIGURE 3 shows a section through a pouring vessel which can be generally employed for pouring subcooled and saturated, solid and crystalline substances in liquids, and FIGURE 4 depicts a device for subcooling and oversaturating solid, particularly crystalline substances in liquids, and for pouring these subcooled and oversaturated liquids into molds.

As shown in FIGURE 4 the bottom of the storage tank is provided on one side with a V-shaped rib 10. In accordance with FIGURES 1 and 2, in one leg of this V, there is an outlet slot 11. This outlet slot can be sealed off by a slide 12. As shown in FIGURE 4, the cooler 2 comprises a plurality of continuous superimposed pipes 13 preferably made from a single bent pipe coil into parallel sections. The individual pipe sections extend laterally beyond the outlet slot 11. The bents 14 are disposed outside of the struts 15 of the housing. The cooler has an inlet 16 and an outlet 17. Under the discharge opening 18 of the collecting trough 3, the connecting pipe 19 extends into the intermediate tank 4.

A temperature detection and control means 20 is provided in the collecting trough 3. Upon an undesirable increase in the temperature of the liquid, this control device controls the opening of the outlet slot 11 of the storage tank 1 by actuating the slide 12, and upon a decrease in the temperature, the closing of this outlet slot. In the intermediate tank 4, an outlet opening 21 is provided, and underneath the latter a connecting pipe 22 is disposed extending into the pouring vessel 5. A seal 23 of plastic plate 24 rests on an opening 21 and closing rod 25. A reinforced portion 26 of the closing rod serves to increase the weight thereof in order to ensure a tight contact of the plate 24 with the bottom and furthermore to ensure that the closing rod falls down smoothly and rapidly. An electromagnet 27 lifts the closure 23 when the inlet for the operating medium is opened, and drops the closure when the feed of operating medium is interrupted. The lid 28 of the intermediate container and a thickened portion 29 of the closing rod 25 above the lid 28, made up, for example, of two counter nuts screwed onto the upper end of the closing rod 25, are provided. The pouring vessel 5 is provided in its bottom with outlet openings 30; short outlet pipes 31 are attached at the bottom underneath these outlet openings. These outlet openings are opened and closed by seals 32. These seals 32 have the bottom plate 33 and the closing rod 34. These closing rods 34 also have a thickened section 35 to weight these rods. The lid 36 of the pouring vessel 5 has a frame 37 extending therearound, by means of which the lid overlaps the upper edge 38 of the pouring vessel 5. The lid 36 has recesses 39 through which extend the upper ends 40 of the closing rods which are widened, for example, by means of counter nuts threaded thereon, so that they are also removed from the pouring vessel 5 when the lid 36 is lifted. The rim 41 of the lid 36 projects beyond the pouring vessel 5 on all sides. Lifting bars 42 with bent sections 43 facing each other engage underneath this projecting rim 41. Electromagnets 44 are disposed laterally above the lid 36 on flanges 45. The upper ends of the lifting bars 42 extend into the inner opening of these magnets. The lifting bars 42 are limited in their downward movement by the flanges 46.

A liquid level measuring device 47 is coupled with a regulator. The regulator, at a minimum height of the liquid level in the pouring vessel 5, closes the circuit of the electromagnet 27, whereby the seal 23 is lifted from the bottom opening 21 of the intermediate container 4. At a maximally permissible liquid level in the pouring vessel 5, the regulator interrupts the circuit of the electromagnet 27, whereby the seal 23 falls back on the bottom opening 21 of the intermediate container 4 and closes this opening. The opening molds 8 move along on the conveyor belt 7 and when a mold has assumed the correct position underneath the pouring vessel actuate a switch means which closes the circuit of the electromagnet 44, and thereby lifts the lifting bars 42, including the lid 36 and the seals 32 of the pouring vessel 5 and open the discharge openings 30 of the pouring vessel.

After a predetermined period of time, the circuit of the electromagnets 44 is interrupted by the switching element 48. The switching element which closes the circuit of the electromagnets 44 interrupts, in this connection, simultaneously the circuit of the means to drive the conveyor belt 7 and arrests same, whereas the switching element 48, upon an interruption of the circuit of the electromagnets 44, at the same time closes the circuit of this driving device, and thus sets the conveyor belt 7 in motion again. The mold 8 has recesses 49 functioning as the molds to be filled. The posts 15 of the frame 6 can be anchored to the floor. However, it is also possible to provide appropriate feet 50 at the lower end of the posts 15 and thus to render the entire system portable.

In an optional arrangement the pouring vessel is provided at the bottom with laterally extending flanges 51 having a bore 52 through which worm screws 53 are passed. It is possible by means of these worm screws 53 to accurately adjust the height of the pouring vessel 5 and additionally to lift the pouring vessel 5 in such a manner that the seals 32 cannot be lifted any more by means of the electromagnets 44. For the purpose of lifting the pouring vessel 5 in this manner, it is also possible to provide a conventional lifting jack.

In an optional arrangement, the storage tank 1 is constructed at the same time to serve as the dissolving vessel 55 for preparing the water-sugar solution, and also as the mixing container 54 for mixing the water-sugar solution with the alcoholic distillates and the like.

The entire device is constructed from materials resistant to chemical attack by the filling liquid, such as from a synthetic material, or from metals, such as stainless steel, brass, copper, and the like.

The process of the present invention is conducted in the apparatus of this invention approximately as follows:

In the container 55, a solution having a temperature of about 110° C. is prepared from water and sugar. This solution flows through conduit 56 into the mixing vessel 54 and is mixed therein with the flavoring substances, particularly the alcoholic distillates. During this procedure, the temperature is reduced to about 60–70° C. This mixture is then conducted through line 9 into the storage tank 1 and from there, through the discharge slot 11, onto the pipes 13 of the cooler 2, whereby the mixture is quenched and cooled to a temperature below the saturation temperature.

The solution flowing off the cooler and which is now subcooled and oversaturated is received in the collecting trough 3. From this trough, the solution flows through conduit 19 into the intermediate container 4; from there, it is withdrawn by appropriate switching elements by way of conduit 22 and conducted into the pouring vessel 5. From the latter, the solution then flows, in doses, through the discharge openings 30 into the molds 49 of the mold unit 8 transported by the conveyor belt 7.

Example

In the solution tank 55 in representative proportions, 100 kg. of sugar are dissolved in 40 liters of water at about 110° C. This solution flows through conduit 56 into the mixing vessel 54 and is mixed therein with 32 liters of brandy having 60% alcohol. The solution, which now amounts to 150 liters and has a temperature of about 70° C., is conducted via line 9 into the storage tank 1. Within about 10 minutes, it flows out of the discharge slot 11 of this tank, i.e., in amounts of 25 cc./sec., onto the pipes 13 of the cooler 2. The cooler employed in this cooler 2 is water having a temperature of about 8° C. The external temperature of the pipes 13 is 8° C. The filling liquid impinging upon the uppermost pipe is thereby immediately quenched from about 60–70° C. to about 35° C. and is undercooled and oversaturated in this step.

From the cooler 2, the now undercooled and oversaturated liquid flows into the collecting trough 3 and from there, through conduit 19 into the intermediate container 4. From the intermediate container 4, this liquid is conducted into the pouring vessel 5 via conduit 22, in correspondence with the height of the liquid level in the pouring vessel 5, by means of appropriate switching elements. From the pouring vessel 5, the liquid flows into the molds through the discharge openings 30 in a correspondingly metered form and in synchronism with the advancement of the mold units 8 by means of the conveyor belt 7.

If the molds are cavities of any desired configuration impressed in powder, they are subsequently stored for 2 to 3 days. During this process, a smooth, clear sugar crust is formed on the walls of the molds and on the surface of the filling liquid, which crust does not have any uneven places worth mentioning. In order to obtain crusts having approximately uniform thickness, the bodies are turned by 180° about 4 to 5 hours after the casting process. The thus-obtained liquid-filled sugar crusts are then coated with chocolate. The chocolate-coated filled candies manufactured in this manner all have approximately the same size. When each piece of candy is individually packaged, they do not get caught in fully automatic packaging devices.

In the further embodiment of the process of this invention, the filling liquid was filled through the discharge openings 30 directly into prefabricated hollow chocolate shells, and the latter were then closed in accordance with the conventional hollow body process. The thus-produced filled candies were stored for 3 days and turned by 180° 4–5 hours after the pouring step. During this storage period, a sugar crust was formed on all sides of the liquid-filled cavity, which made it impossible for the alcoholic distillates to diffuse through the chocolate wall of the hollow bodies and for the filling liquid to attack the hollow chocolate shells. Liquid-filled candies manufactured in this manner, especially when the filling liquid contained alcoholic distillates, could be stored for 12 months without any deterioration in quality.

In addition to being filled into chocolate shells and into molds impressed in powder, the filling liquid can also be poured into molds of other types, e.g., those of metal, a synthetic material, and the like.

It is also possible to additionally insert in the hollow bodies to be filled with fruits, nuts, or the like.

Figure 5:
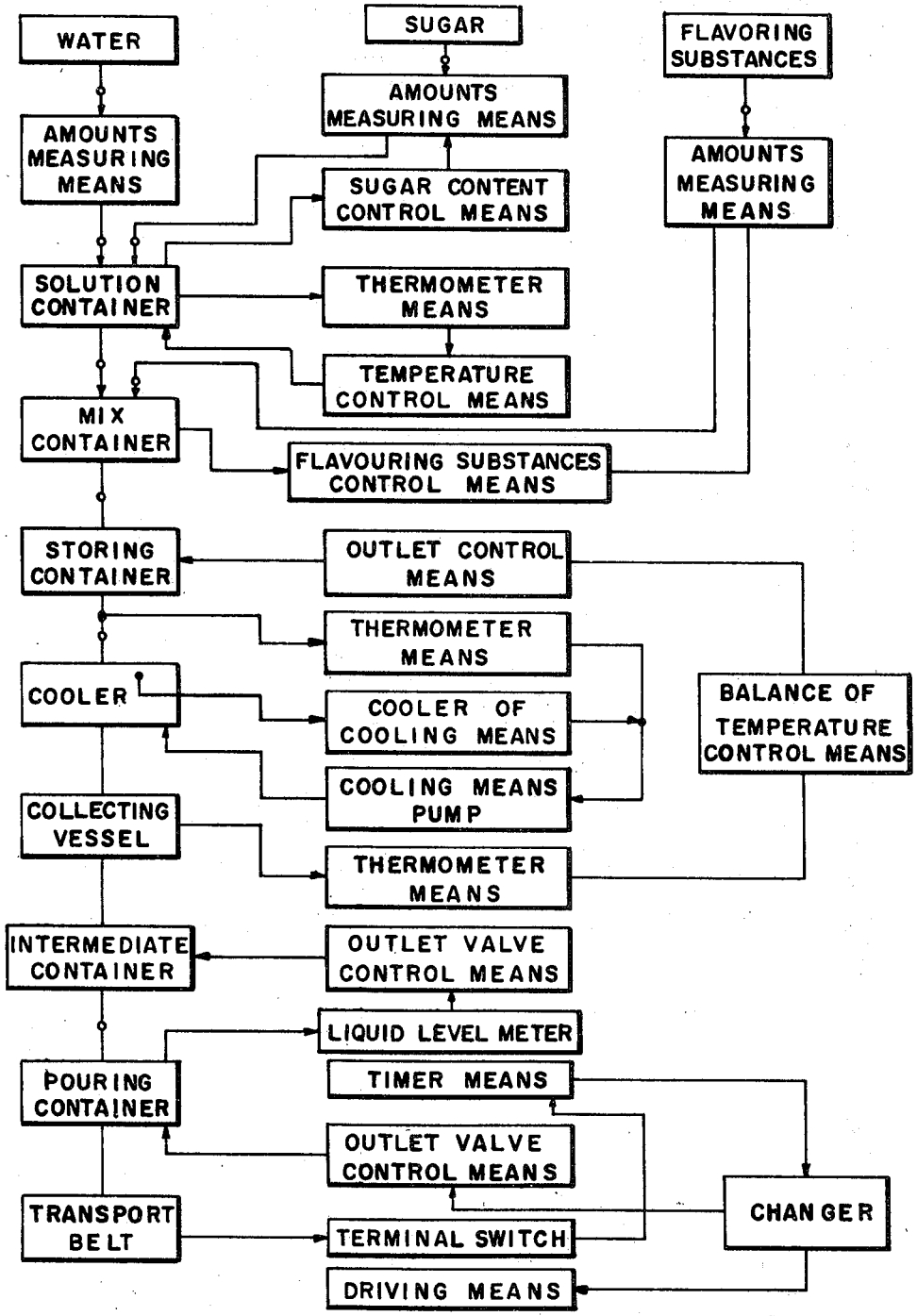
FIGURE 5 is a schematic diagram of the means and steps involved in the present invention.

In the diagram in FIGURE 5, the cooperation of the individual parts of a possible plant of this invention is illustrated by way of example.

Water, sugar, and the flavoring substances are in their storage containers. However, water can also be withdrawn from a water pipeline. From the storage containers and the water line, respectively, water and sugar are withdrawn in desired, predetermined amounts and filled into the solution container. At correspondingly high temperatures, the sugar is dissolved in the water. The temperature required for this purpose depends upon the desired sugar content of the solution. The higher the sugar content of the solution is to be, the higher must be the temperature. In order to always obtain the correct temperature of the solution, it is possible to provide a temperature measuring device in the dissolving container, e.g., a thermoelement coupled with a temperature control unit which closes or opens the energy supply for heating the solution container to a greater extent. In order to always obtain the correct sugar content of the solution, it is furthermore possible to provide in the solution container a sugar content regulator, e.g., an aerometer coupled with the quantity measuring device for sugar and correspondingly increasing or lowering the amount of sugar to be filled into the solution container.

From the solution container, the sugar-water solution is filled, by way of a conduit which can be closed, for example, by means of a slide valve, into the mixing container. In the mixing vessel, there is added to the solution an amount of flavoring substances, predetermined with respect to its quantity, from the storage container. In order to ensure a constantly uniform content of flavoring substances, it is possible to provide in the mixing vessel a flavoring content regulation, e.g., likewise an aerometer combined with the quantity measuring device for the flavoring substances and increases or lowers the amount to be added in correspondence with the concentration.

In place of automatic refilling devices, it is, of course, also possible to fill in water, sugar, and flavoring agents in correspondence with the amount determined as being missing, by hand, e.g., with buckets and the like.

From the mixing vessel, the filling liquid, now complete, is filled into the storage container, e.g., by way of a conduit which can be closed off by means of a slide valve.

From the storage container, the solution flows across the cooler and is cooled therein from a temperature above the saturation temperature to a temperature below the saturation temperature, and this is done so rapidly that no sugar crystallizes. In the most simple manner, it is possible to employ water withdrawn, for example, from the water conduit, as the coolant. In order to avoid water losses, it is possible to cool the coolant flowing out of the cooler for the filling liquid in a second cooler of any desired construction again to a correspondingly low temperature. In the cooler for the filling liquid, the latter is to be quenched in order to avoid, in spite of going below the saturation temperature, the crystallization of sugar. The highest temperature in the cooler for the filling liquid thus must not exceed a certain magnitude. For this reason, it is further possible to arrange in the cooler for the filling liquid a temperature measuring device, e.g., a thermoelement coupled with the drive of the pump for the coolant of the cooler for the filling liquid and accelerating, upon an increase in the temperature in the cooler for the filling liquid, the coolant circulation above a predetermined value and lowering the coolant circulation when the temperature decreases.

From the cooler, the quenched filling liquid flows into a collecting trough. In this trough, it is also suitable to provide a temperature measuring device, e.g., a thermoelement which is coupled with a control unit of the exit slide valve of the storage container, e.g., a regulating device. If the temperature of the filling liquid in the collecting trough rises above a predetermined value, the outlet slide valve of the storage vessel is opened to a greater extent by the temperature measuring unit and the regulator. If the temperature becomes lower, the outlet slide valve is closed to a greater extent.

From the collecting trough, the filling liquid flows, for example through a pipe, into the intermediate container, and from this intermediate container the filling liquid is filled into the pouring vessel. From the pouring vessel, the filling liquid is poured by way of closable outlet pipes into the hollow spaces of molds conveyed on a conveyor belt.

The amount of filling liquid necessary for filling one cavity is predetermined. The amount exiting from the outlet pipe depends upon the magnitude of the diameter of the outlet pipe at the narrowest point thereof, upon the opening time of the closures, and upon the level of the filling liquid in the pouring vessel. With a uniform narrowest diameter of the outlet pipes, equal opening time of the closures, and always the same liquid level, the amount flowing out of one outlet pipe is always respectively the same at any opening.

The diameter of the outlet pipes at their narrowest point is the same in all outlet pipes and is predetermined by the construction thereof.

In order to provide in the pouring vessel always approximately the same height of the liquid level, a liquid level measuring device is provided therein, e.g., a level regulator, coupled with the control device of the outlet closure in the intermediate container. If the liquid level in the pouring vessel falls below a predetermined height, the closure of the outlet of the intermediate container is opened by way of level regulator and control unit. If the liquid level in the pouring vessel inceases beyond a predetermined value, conversely the exit closure of the intermediate container is sealed off.

In order to ensure that the opening time of the closures of the outlets in the pouring vessel is always the same, the control unit of these closures is coupled with a time clock starting at the opening of the closures and closing these closures again after a predetermined time.

The conveyor belt and the control of the closures of the outlets in the pouring vessel can be coupled with a terminal switch which, at the correct position of the pouring mold underneath the pouring vessel opens the closures of the outlets in the pouring vessel, by way of the control device. This terminal switch can furthermore be coupled with the drive of the conveyor belt in such a manner that, upon the correct positioning of the pouring mold underneath the pouring vessel, it interrupts the drive of the conveyor belt. The time clock which again closes the closures of the outlets of the pouring vessel after a predetermined period of time can likewise be coupled with the drive of the conveyor belt, in such a manner that, after the outlets are closed, the time clock again actuates the drive.

Figure 6:
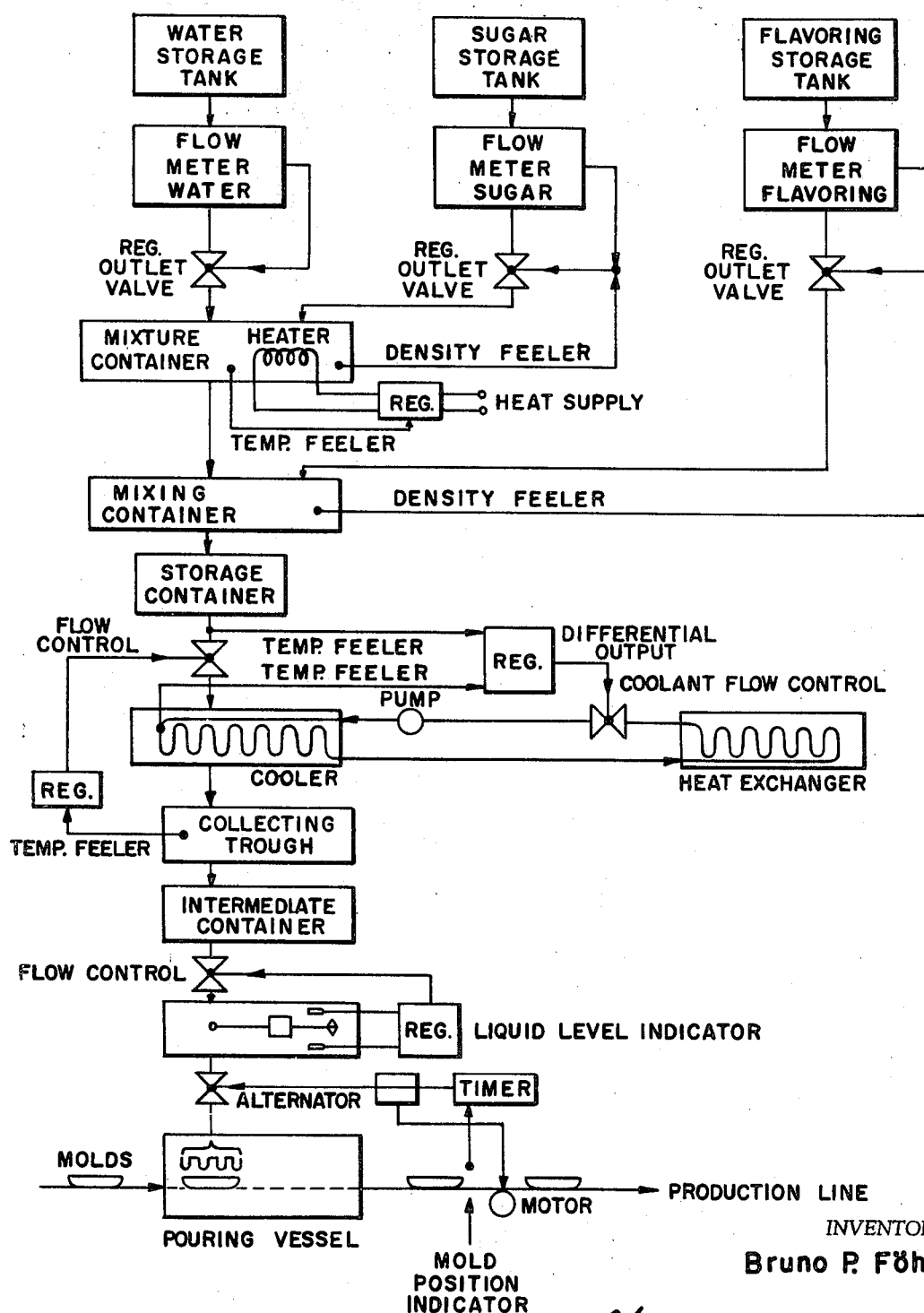
FIGURE 6 is a schematic diagram of the basic circuitry in accordance with the invention.

In FIGURE 6, representing a block diagram of the process of the present invention, water, sugar, and flavoring substances are in three storage containers. These components are introduced into a mixing vessel by way of metering devices, consisting of a quantity measuring unit and a valve controllable by the latter.

First of all, sugar and water are introduced into a dissolving container maintained at a constant temperature by means of conventional control systems, and wherein, by measuring the density of the liquid, e.g., by means of aerometers, and controlling the stream of sugar, the sugar concentration is maintained constant.

The stream of flavoring agents flowing into the mixing vessel is likewise adjusted by measuring the concentration and by means of control of the stream in such a manner that the concentration of the flavoring agents in the filling liquid is constant.

Upon the mixing vessel there follows a storage vessel as a buffer container. From this storage vessel, always only so much filling liquid is withdrawn by way of the cooler that the temperature in the collecting trough is less than 35° C., suitably 26–28° C. A temperature probe present in the collecting trough regulates a control valve for this purpose provided between the storage container and the cooler.

The temperature jump effective upon the filling liquid, which is to produce a cooling velocity of 20° C. per second, is measured before the control valve behind the storage container in the stream of the filling liquid and on the inlet side of the cooler in the stream of the cooling fluid.

The cooling fluid circulating in the cooler and being moved by a pump is adjusted with respect to its amount by influencing the pump or by way of a passage valve by means of a regulator in such a manner that the temperature difference between the two measuring points—exit from the storage container, inlet of the cooler—is maintained.

The cooling system consists, in a conventional manner, of a cooler and a heat exchanger with a controllable pump, or with a pump and a controllable passage valve.

After the collecting trough, the filling liquid arrives, by way of intermediate container the filling of which is controlled by a level regulating unit, into a pouring container. From here, the filling liquid is poured into molds.

For this purpose, the molds, provided on a belt, are moved by a drive motor underneath the pouring ports until they trigger an electrical contact which latter then arrests the drive motor when the mold is exactly underneath the pouring ports. The same contact switches on an electrical time clock which clock opens the passage valve located above the pouring ports and closes same again after the pouring time has elapsed. After this valve is closed, the drive motor is switched on until the subsequent pouring mold is located underneath the pouring port. The alternation between pouring and belt movement is executed by an alternator.

The means and steps described and shown represent optimum arrangements required for a full foolproof automation electrically. It is possible, however, to leave out various of the means and steps outlined altogether, or to change various of the sequences of steps and means outlined, or to substitute for any of the electrical controls manual operations, without making the apparatus inoperable and without departing from the spirit and scope of the invention.

What is claimed is:

1. A process for the manufacture of liquid-filled candies with a crust, comprising the steps of: preparing a solution from water and sugar, heating it to at least the sugar saturation tempreature, mixing said solution with a flavoraing substance to form a filling liquid; decreasing the temperature of the filling liquid to a temperature below the sugar-saturation temperature of the filling liquid so rapidly that no sugar precipitates, and casting said rapidly cooled filling liquid into molds.

2. A process for the manufacture of liquid-filled candies with a crust as claimed in claim 1, further comprising the step of quenching the hot solution.

3. A process for the manufacture of liquid-filled candies with a crust as claimed in claim 1, said flavoring substance being high percentage alcoholic.

4. A process for the manufacture of liquid-filled candies with a crust as claimed in claim 1, the mixture of said sugar, water and flavoring substance being in the proportions of about 100 kg. to 40 liters and 32 liters, respectively.

5. A process for the manufacture of liquid-filled candies with a crust as claimed in claim 1, said step of decreasing the temperature rapidly comprising doing so at a temperature rate of at least about 20° C. per second.

6. A process for the manufacture of liquid-filled candies with a crust as claimed in claim 1, said step of decreasing the temperature rapidly comprsing the step of doing so at a temperature below the melting point of chocolate.

7. A process for the manufacture of liquid-filled candies with a crust as claimed in claim 6, said step of decreasing the temperature rapidly comprising doing so to a temperature of below 35° C.

8. A process for the manufacture of liquid-filled candies with a crust as claimed in claim 6, said step of decreasing the temperature rapidly comprising doing so to a temperature of between 26°–28° C.

9. A process for the manufacture of liquid-filled candies with a crust as claimed in claim 1, said step of casting ing the step of pouring the cooled solution into hollow chocolate shells and subsequently closing said shells.

10. A process for the manufacture of liquid-filled candies with a crust as claimed in claim 1, said step of casting comprising the step of preparing said mold by impressing it into a powder for casting said filling liquid therein.

11. A process for the manufacture of liquid-filled candies with a crust as claimed in claim 1, said step of preparing said solution including doing so in the proportions of about 100 kg. of sugar to about 42 liters of water; said step of heating occurring at a temperature of about 110° C; said step of mixing comprising doing so with an about 60% alcohol base flavoring substance to a temperature of about 70° C. into a total solution amounting to about 150 liters; forwarding the mixing liquid to the next step at 25 cc. per second and decreasing its temperature to about 35° C. until under-cooling at below sugar saturation temperature without precipitation of the sugar crystals occurs.

References Cited

UNITED STATES PATENTS

| 1,414,528 | 5/1922 | Scott | 107—54.6 |
| 1,537,669 | 5/1925 | Griffith | 107—54.6 |
| 1,886,858 | 11/1932 | Werner et al. | 107—3 |
| 2,537,453 | 1/1951 | Frangialli | 99—78 |
| 3,229,647 | 1/1966 | Von Drachenfels et al. | 107—54.6 |

FOREIGN PATENTS

| 28,025 | 9/1927 | Great Britain. |

WALTER A. SCHEEL, Primary Examiner

R. I. SMITH, Assistant Examiner

99—23, 134; 107—1, 4